US008864585B2

(12) United States Patent
Lesley et al.

(10) Patent No.: US 8,864,585 B2
(45) Date of Patent: Oct. 21, 2014

(54) GAMING TERMINAL WITH A LIGHT DISSIPATING PUSH-BUTTON

(71) Applicant: WMS Gaming Inc., Waukegan, IL (US)

(72) Inventors: Paul M. Lesley, Blue Island, IL (US); Bradley D. Cornell, LaGrange, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/775,565

(22) Filed: Feb. 25, 2013

(65) Prior Publication Data

US 2014/0094308 A1 Apr. 3, 2014

Related U.S. Application Data

(60) Provisional application No. 61/707,409, filed on Sep. 28, 2012.

(51) Int. Cl.
*G06F 17/00* (2006.01)

(52) U.S. Cl.
USPC .............................. 463/37; 463/16

(58) Field of Classification Search
CPC . G07F 17/32; G07F 17/3209; G07F 17/3202; G07F 17/3211; G06F 3/0202
USPC .............................. 463/1–31; 273/143 R, 292
See application file for complete search history.

(56) References Cited

U.S. PATENT DOCUMENTS

| | | | |
|---|---|---|---|
| 6,517,433 B2 | 2/2003 | Loose et al. | 463/20 |
| 7,892,096 B2 * | 2/2011 | Rigsby et al. | 463/37 |
| 8,235,789 B2 | 8/2012 | Rasmussen | 463/20 |
| 2005/0261057 A1 * | 11/2005 | Bleich et al. | 463/30 |
| 2006/0166728 A1 * | 7/2006 | Cornell et al. | 463/16 |
| 2006/0178205 A1 | 8/2006 | Bleich et al. | 463/22 |
| 2008/0113707 A1 * | 5/2008 | Nesemeier et al. | 463/16 |
| 2008/0113766 A1 | 5/2008 | Waxman et al. | 463/25 |
| 2010/0069160 A1 | 3/2010 | Barrett et al. | 463/46 |
| 2010/0234099 A1 | 9/2010 | Rasmussen et al. | 463/29 |
| 2013/0079157 A1 | 3/2013 | Chudek et al. | 463/46 |
| 2014/0008188 A1 * | 1/2014 | Sakamoto et al. | 200/61.1 |

FOREIGN PATENT DOCUMENTS

| | | | | |
|---|---|---|---|---|
| JP | 07288062 A | * | 10/1995 | H01H 13/02 |
| JP | 2012200343 A | * | 10/2012 | |

OTHER PUBLICATIONS

Evonik Cyro LLC of Parsippany, New Jersey, USA, "Acrylite Satinice" (downloaded on Jun. 5, 2013 from: http://www.acrylite.net/sites/dc/Downloadcenter/Evonik/Product/ACRYLITE/3773-satinice-technical-data.pdf.), 3 pages.
Evonik Cyro LLC of Parsippany, New Jersey, USA, "Acrylite for Lighting Technologies," (downloaded on Jun. 5, 2013 from: http://www.acrylite.net/sites/dc/Downloadcenter/Evonik/Product/ACRYLITE/3788-market-segment-brochure-for-lighting-technologies.pdf.), © 2012, 20 pages.
RTP Company of Winona, Minnesota, USA, "Light-Diffusing Compounds," (downloaded on Jun. 5, 2013 from http://www.rtpcompany.com/info/flyers/led.pdf.), © 2012, 2 pages.
RTP Company of Winona, Minnesota, USA, "Engineered Thermoplastic Compounds for LED Lighting Applications," (downloaded on Jun. 5, 2013 from http://www.rtpcompany.com/info/briefs/led-lighting.pdf.), © 2013, 6 pages.
Mold-Tech® Midwest, a Standex Int'l company, of Carol Stream, Illinois, "Texturing in Depth: Everything You Need to Know About Texturing Your Mold," downloaded on Jun. 5, 2013 from: http://www.mold-tech.com/texturing/Texturing-In-Depth.pdf. , 26 pages.

* cited by examiner

*Primary Examiner* — Masud Ahmed
(74) *Attorney, Agent, or Firm* — Nixon Peabody LLP

(57) ABSTRACT

A player-input device for a gaming system includes a light-transmissive button lens comprising interior and exterior surfaces extending to an outside perimeter. A textured surface is located along the outside perimeter of the button lens. A light source is disposed below a bottom edge of the button lens. The light source is operative to transmit light into the button lens such that the outside perimeter is illuminated at the textured surface. The textured surface is configured to dissipate the light over a substantial portion of the textured surface.

20 Claims, 11 Drawing Sheets

GAMING TERMINAL WITH A LIGHT DISSIPATING PUSH-BUTTON

CROSS-REFERENCE TO RELATED APPLICATION

This application is related to and claims the benefits of U.S. patent application Ser. No. 61/707,409, filed Sep. 28, 2012, which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and, more particularly, to a light dissipating push-button lens for a gaming terminal.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

Gaming terminals can be located in high-traffic areas and can experience continuous use over extended periods of time. Gaming terminals also require player-input devices such as buttons on a button panel. Both the terminals as well as terminal components such as mechanical and electro-mechanical buttons are susceptible to damage and wear as a result of typical use and occasional misuse.

It would be useful to develop terminals and terminal components such as input devices to increase reliability and longevity of the terminals and input devices.

SUMMARY OF THE INVENTION

According to one aspect of the present invention, a push-button device associated with a gaming machine comprises a button lens including interior and exterior surfaces extending to an outside perimeter. In an operative state the exterior surface of the button lens is exposed to and the interior surface is protected from a gaming environment external to a gaming machine. A side wall includes a protected interior surface and an exposed exterior surface. The side wall extends downwardly from the outside perimeter of the button lens. The side wall includes a first end attached to the outside perimeter of the button lens and a second end having an exposed edge. The button lens and side walls comprise a material that allows light to pass through. A textured surface is located along a perimeter of the push-button device. The perimeter is defined by at least one of the outside perimeter and the side wall. A light source is disposed below the second end of the side wall. The light source is operative to transmit light into the side wall such that the perimeter of the push-button device is illuminated at the textured surface. The textured surface is configured to dissipate the light over a substantial portion of the textured surface.

According to another aspect of the invention, a player-input device for detecting player selections at a gaming machine comprises a light-transmissive button lens including interior and exterior surfaces extending to an outside perimeter. A textured surface is located along the outside perimeter of the button lens. A light source is disposed below a bottom edge of the button lens. The light source is operative to transmit light into the button lens such that the outside perimeter is illuminated at the textured surface. The textured surface is configured to dissipate the light over a substantial portion of the textured surface.

According to yet another aspect of the invention, a gaming machine for playing a wagering game includes at least one push-button assembly for detecting player selections. The at least one push-button assembly comprises a light-transmissive button lens. A light-transmissive side wall extends downwardly from an outside perimeter of the button lens. A textured surface is located along at least one of the side walls and an outside perimeter of the button lens. A light source is disposed below an exposed edge of the side wall. The light source is operative to transmit light into the side wall and illuminate the textured surface. The textured surface is configured to dissipate the light over a substantial portion thereof.

Additional aspects of the invention will be apparent to those of ordinary skill in the art in view of the detailed description of various embodiments, which is made with reference to the drawings, a brief description of which is provided below.

Figure 1:
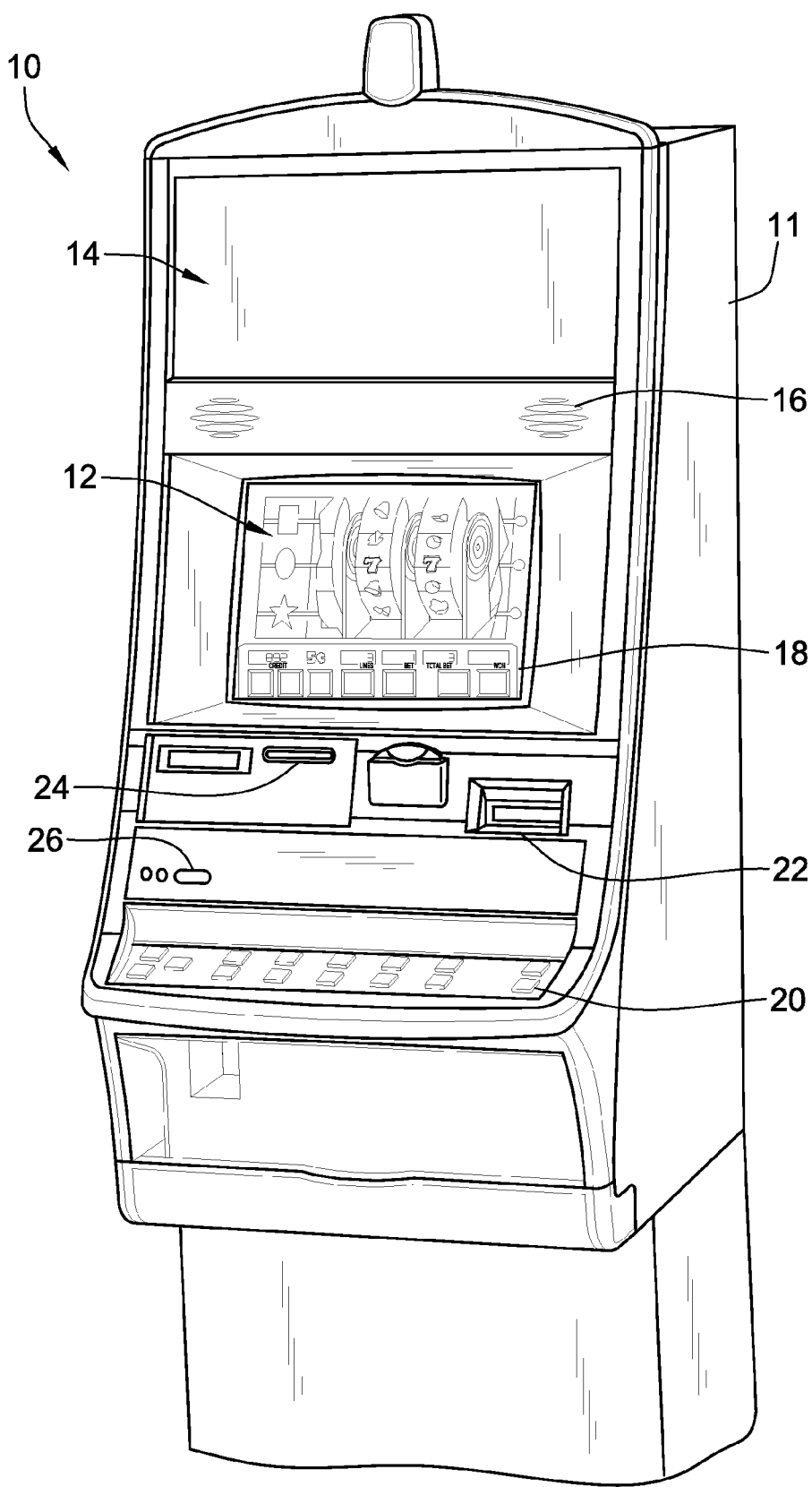
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
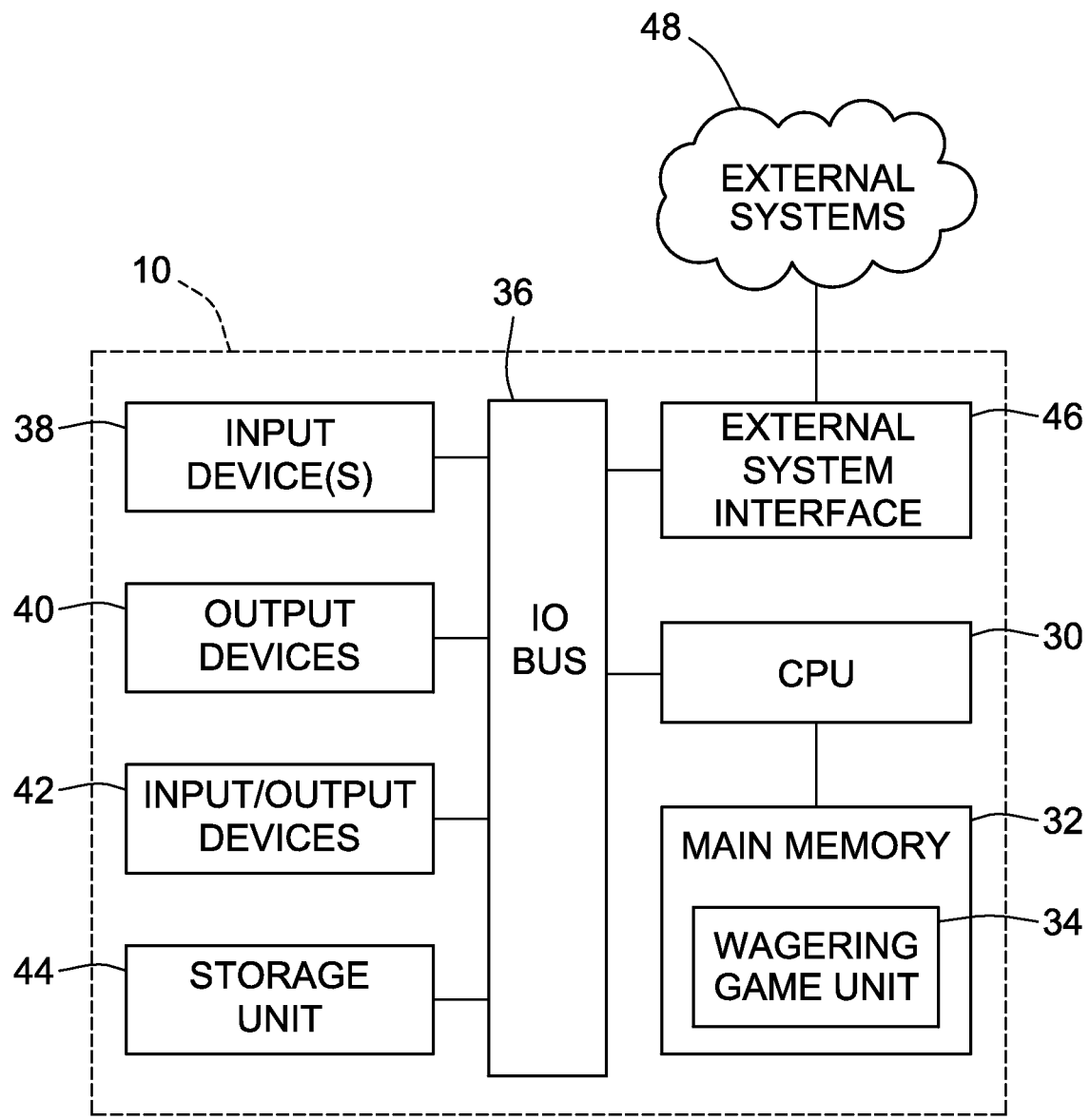
FIG. 2 is a schematic view of a gaming system according to an embodiment of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
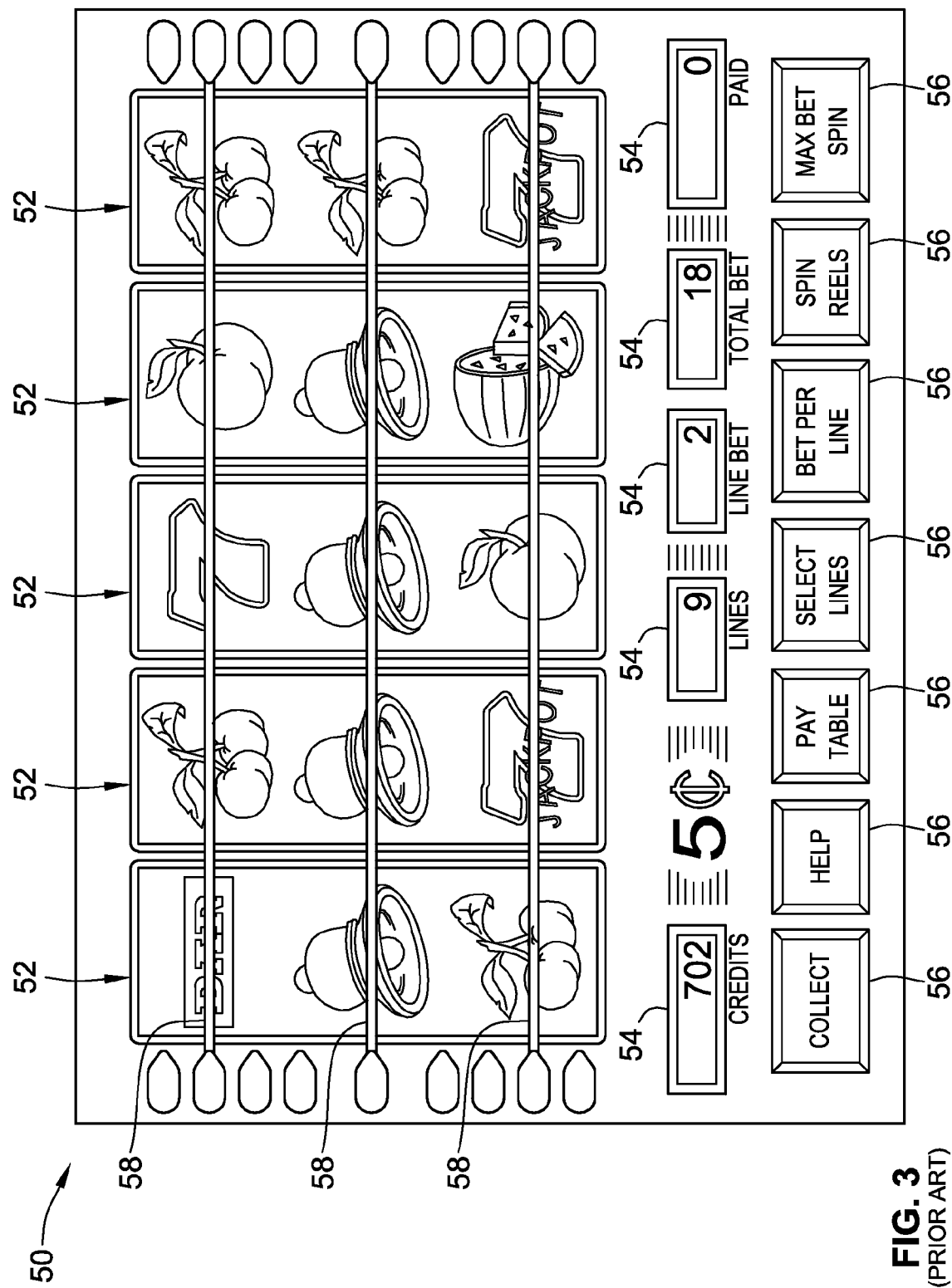
FIG. 3 is an image of an exemplary basic-game screen of a wagering game displayed on a gaming terminal, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
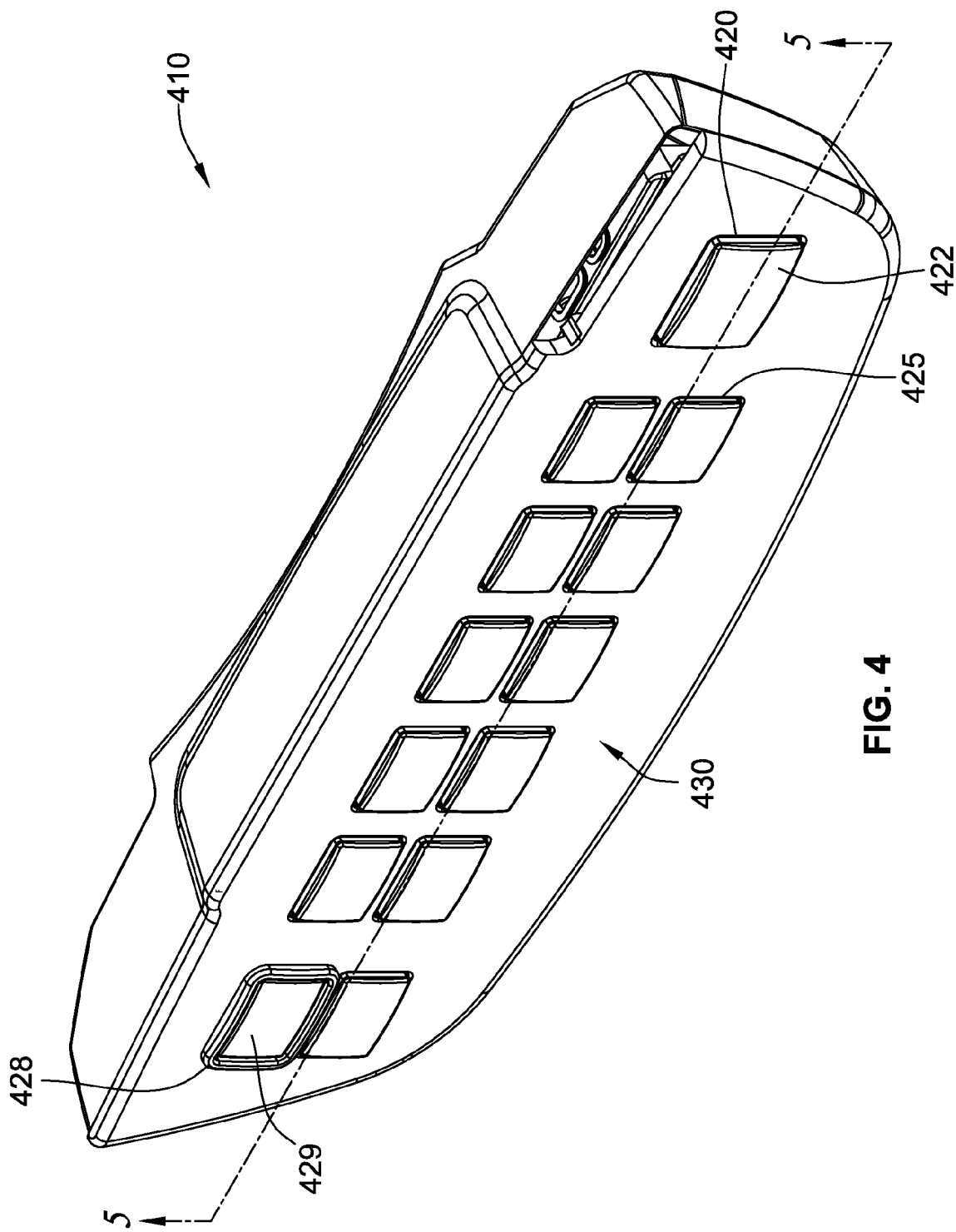
FIG. 4 is a perspective view of an exemplary button panel for a gaming machine including push-button devices, according to an embodiment of the present invention.

Referring now to FIG. 4, a perspective view of an exemplary button panel 410 for a gaming machine is illustrated that includes a plurality of push buttons of vary shapes and sizes, such as push buttons 420, 425, or 429. Each of the push buttons are an exemplary type of input device for the gaming machine that accept player input(s) and transform the player input(s) to electronic data signals indicative of the player input(s). The top surface 430 of the button panel 410 may be generally continuous and flat with the exception of the protruding push-button(s). It is contemplated that a push button or an upper surface 422 of a button lens may extend slightly above the top surface 430 of the button panel, as generally illustrated in FIG. 4. A push-button or the upper surface of a button lens can also be substantially flush with the top surface 430. The top surface 430 may be flat or have a curved shape. For example, the top surface 430 may be curved or contoured to have an ergonomic shape that better conforms to a typical player of a gaming machine. The top surface can also have a parabolic shape or a stepped shape such that certain push buttons or button lenses may be higher on the button panel 410 than other push buttons or button lenses.

Push-button 429 is a type of push button having a button lens that extends through a bezel 428. The bezel extends around the perimeter of the button 429 and provides a border for the button lens. The bezel may be illuminated to provide a visually appealing outline and highlight of the button to a player, but such arrangements can include localized "hot spots" of intense light rather than evenly distributed light around the entire bezel 428. It can also be desirable in certain aspects of a gaming machine to reduce the number of parts for a button panel, such as eliminating a bezel, while retaining and improving upon the desirable features, including improving the perimeter highlighting of push-button(s). This can result in the retention of the overall visual appeal and ease of use for a player of a gaming machine while reducing the cost of a push-button device along with increasing the resiliency of the push-button and button panel. Push buttons 420 and 425 illustrate exemplary aspects of a push button with improved perimeter highlighting and are discussed in more detail below.

Figure 5:
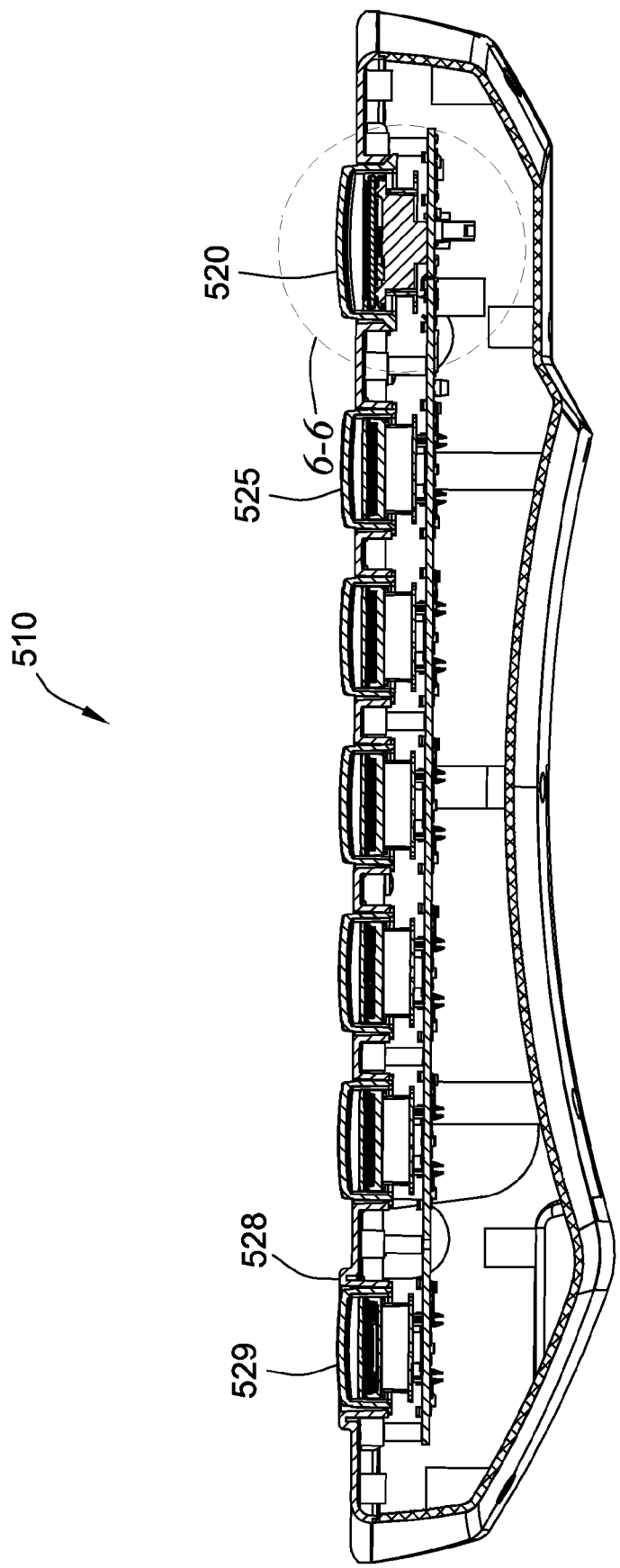
FIG. 5 is a side-section view of a button panel, according to an embodiment of the present invention.

Referring now to FIG. 5, a cross-section of a button panel 510 is illustrated including cross-section details for push-button assemblies associated with exemplary push buttons 520, 525, and 528, which are similar to push buttons 420, 425, and 528 from FIG. 4. Again, the push buttons may have varying shapes and sizes. Push button 528 includes a bezel 529 that is similar to the bezel discussed above in the context of FIG. 4. Additional exemplary push button assembly details are provided in FIG. 6 for push button 520 that would similarly apply to push button 525.

Figure 6:
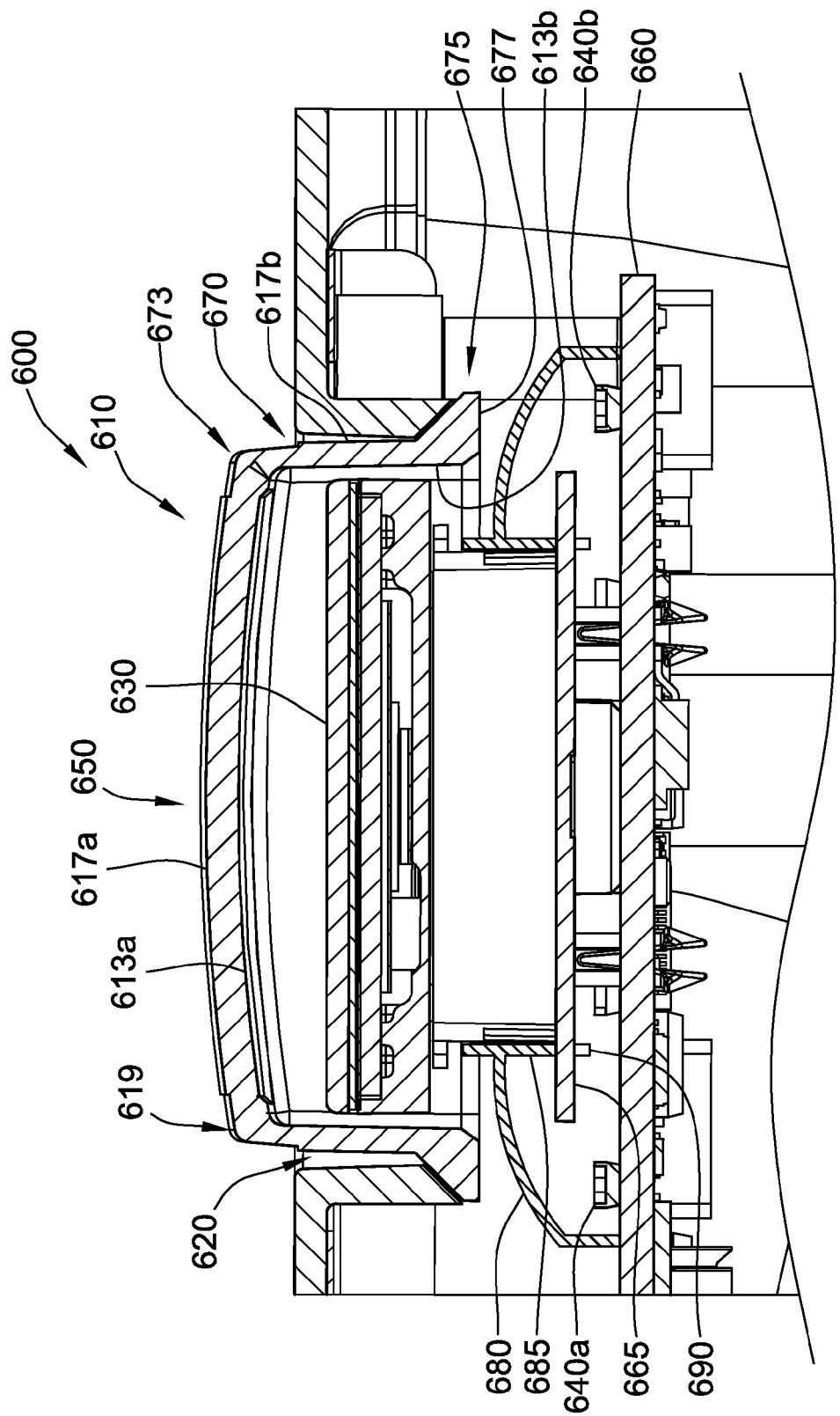
FIG. 6 is a detailed side-section view of an exemplary push-button device from FIG. 5, according to an embodiment of the present invention.

Turning now to FIG. 6, a push-button assembly 600 is illustrated that may be a part of a larger button panel, such as button panel 410 in FIG. 4 or button panel 510 in FIG. 5. The push-button assembly 600 can include features for actuating a switch or other device within the button panel in response to a player touching or pressing a button lens 610 that extends through a panel opening 620 or other aperture within the upper surface of the button panel. Within the gaming machine, the push-button assembly 600 can be used to receive different types of player input(s), and may be for example, a "Spin Reels" button that the player touches or presses to initiate a game. The exemplary push-button assembly 600 includes a button lens 610 having side walls 670 extending downwardly from an outside perimeter 619 of the button lens 610. The push-button assembly may also include a display 630 and light source(s) 640a, 640b. The display 630 can be a flat LCD or OLED screen that is positioned below and is visible through a transparent center portion 650 of the button lens 610.

The push-button assembly 600 may be mounted or otherwise connected to a panel circuit board 660 that supports one or more push-button assemblies. It is contemplated that the panel circuit board 660 can also support other elements of the button panel, in addition to the push-button assembl(ies). As the button lens is depressed by a player, the button lens 610, side walls 670, and display 630 move as a single unit for a limited distance into the button panel toward the panel circuit board 660. The distance or depth that the button can be depressed is limited so that the base or bottom surface of the side wall(s) 670 of the button rest just above the light source(s) (e.g., 640a, 640b) when the push button is fully depressed. In certain aspects of a push-button assembly, it may be desirable for the depression stroke of the push-button to leave a minimal clearance or space between the base surface of the side wall(s) and the top surface of the light source(s). In certain aspects, minimal clearance may be defined as the extremes of the tolerance band of the depression stroke of the push button that prevents contact between the base surface of a side wall and the top surface of a light source.

The light source(s) (e.g., 640a, 640b) can also be mounted to a panel circuit board 660, such as a primary printed circuit board including switch pads that are closed using conductive carbon pads. In one exemplary aspect, carbon pads 690 may be mounted to and protrude from a movable extension 685 of a flexible membrane 680 (e.g., a flexible silicone rubber boot). The flexible membrane 680 may be in contact with a generally horizontal floating plate 665 such that the carbon pads 690 extend through the plate and make contact with contact pads on a circuit board below the floating plate 665. The carbon pads 690 may then be actuated by the simultaneous movement of the button lens and side walls upon a depression stroke of the push-button by a gaming machine user. The flexible membrane 680 can be operative for conveying the carbon pads 690 to complete a closure of a switch circuit associated with push-button assembly while also providing sealing protection of select electronics of the push-button panel by limiting exposure to liquids. In some aspects of a push-button assembly, it is contemplated that approximately two to five carbon pads may be used on each side of a button, with the carbon pads protruding from the flexible membrane similar to the cross-section illustrated in FIG. 6.

As discussed previously, a top or upper surface (e.g., 430) of a button panel may have opening(s) through which the button lens 610 can extend into the gaming environment and be accessible to a player of the gaming machine. While portions of the button lens, such as the top center portion 650, may be fully or substantially exposed to the player and the gaming environment, some parts of the button lens, such as portions of the side wall 670 may be minimally or indirectly exposed to the gaming environment, or not exposed at all. The push-button assembly illustrated in FIG. 6 is one exemplary aspect of a light dissipating button that eliminates the need for an illuminated bezel while retaining select desirable features, such as highlighting of the perimeter of the button lens.

In some aspect of a push-button assembly, such as push-button assembly 600, the button lens 610 includes an interior surface 613a and an exterior surface 617a that extend to an outside perimeter 619 of the button lens 610. In an operative state (e.g., during game play), the exterior surface 617a is exposed to and the interior surface 613a is protected from the gaming environment that is external to the gaming machine. In certain aspects, the side wall 670 that extends downwardly from the button lens 610 includes an interior surface 613b protected from the gaming environment and an exposed exterior surface 617b. The side wall 670 illustrated in FIG. 6 also includes a first end 673 attached to the outside perimeter 619 of the button lens and a second end 675 having an exposed edge 677 forming a base or bottom surface of the side wall 670.

A button lens and/or side wall(s) can be fabricated using materials that allows light to pass through. For example, the button lens may be fabricated from a transparent or translucent polymer material, such as a polycarbonate or acrylic material. The thickness of the side wall and button lens can vary depending on different available manufacturing processes for plastic gaming machine buttons. In some aspects of push buttons, the thicknesses of the side walls and button lens may range from about 2 mm to about 5 mm. The thicknesses may be continuous or may vary between this range.

Light sources, such as light sources 640a, 640b, can be disposed below the exposed edge 677 of the side wall 670. The light sources are operative to transmit light into the side wall 670 such that the outside perimeter 619 of the button lens 610 has an appearance of being illuminated via diffusion of the emitted light on textured surface(s) on the button lens 610 and/or side wall 670. The textured surface(s) diffuse the emitted light from the light source(s) causing the light to be dissipated over a substantial portion of the textured surface. The diffusion of the emitted light is desirable because it provides for uniform lighting over a substantial portion of the textured surface without the presence of localized "hot spots" that are typically visible for buttons, such as along an exposed seam or for light that may be transmitted onto a generally transparent button lens, side wall surface, or bezel. The textured surface can be continuous and extend around the entire outside perimeter of button lens 610, highlighting the location and approximate boundary of the portion of a push button that is exposed to a player. The illumination of the textured surface at the outside perimeter of the button lens 610 is especially desirable because it gives the appearance to the player of framing around the button and in some aspects can provide glow-like effects, without the need for a separate illuminated bezel.

The light source can include different lighting options. It is contemplated that the light source(s) can include one or more omnidirectional lighting elements, such as light-emitting diodes evenly distributed around the bottom edge of a button lens, as illustrated for example by light sources 640a, 640b. The light from the light source enters the button lens through light received at the exposed or bottom edge of the side wall 670 and may be piped or propagated along a pathway created by the surfaces of the side wall. The light illuminates the side wall and can then be diffused upon encountering a textured surface. The light can propagate through the side wall material via total internal reflection principles which are then disrupted upon the light being received on the textured surface which causes at least some of the light to be diffused.

In certain aspects a light source may include a focused or a directional light source. The light from a directional light source can be directed at the exposed or bottom edge of the sidewall. It is contemplated that the cone of light created by the directional lighting is directed toward the bottom or exposed edge of the side wall. The lighting source is also contemplated to be separated from the exposed edge by a predetermined distance so that the cone or spread of the beam is sufficient so that when the light beam from the directional lighting source reaches the bottom or exposed edge of the side wall, the light beam is approximately as wide or wider than the distance between adjacent light sources. It some aspects, the light source includes a plurality of lighting elements or lighting sources (e.g., sources 640a, 640b) spaced just below the exposed edge of the side wall extending from the outside perimeter of the button lens. The spacing between the lighting elements below the exposed edge is such that the cones of light created by each source are directed at the exposed surface where the light cones spread and overlap a distance away from the lighting element as the light from each lighting element is dissipated at a textured surface on the side wall and/or button lens.

In some aspects of a push-button assembly, a center of an illumination source (e.g., a light source) is positioned to maximize the amount of light captured and transmitted to the textured, illumination portions of each side wall and/or button lens. For example, a light source, such as an LED light source, may include a lens sitting above and protecting the actual light-producing element of the light source. The center of that lens can be positioned directly below the base of the side wall of a button such that the center of the light source sits below the center of the side wall (e.g., half the thickness or halfway between interior and exterior surfaces of the side wall). Such positioning can be desirable where the side wall is fabricated using a transparent material. Where the side wall is fabricated both a transparent material layer and a light dissipating layer (see, for example, FIG. 15), the positioning of the center of an illumination source below the side wall will depend on the geometry of the two layers, and it may be more desirable to position the center of an illumination source below a diffusion layer rather than below a transparent layer.

In some aspects, it may be desirable for the side wall of the button lens to come in close contact with an illumination or light source. For example, a flexible or compressible index refraction matched transparent material (e.g., silicone-based layer) may be placed on a lens of an LED light source. The illumination source may then come in contact with the base or bottom surface of a side wall (e.g., which is integral with the button lens) at the bottom of an actuation or depression stroke of the push button such that a minor compression at the bottom of the depression stroke serves to emphasize the perimeter illumination of the button lens and/or side walls. The base surface of the side wall may come into contact with the compressible transparent material that sits on the lens of the light source such that the light from the light source is directly piped into the side wall when the push button is fully compressed. Then, by allowing such intimate contact between the side wall and light source, the light transmission is increased at the actuation point which may increase the intensity of the light dissipation effect on the textured surface of the button lens and/or side wall. In some aspects, it may be desirable for the emphasis of the perimeter illumination effect, coincident to the button activation and its consequent result, to be further emphasized or highlighted with additional lighting effects such as an instantaneous color change if the illumination source includes color changeable LED components. It is contemplated that in some aspects the compressible transparent layer and side wall material are index refraction matched. It is further contemplated that the lens of the light source (e.g., illumination source), the compressible transparent layer, and the side wall material can all be index refraction matched.

It would be understood in the field of the present disclosure that in some aspects, a button lens may be just the top layer of an exposed portion of a cap or push-button device and in other aspects a button lens may also include the side walls or other surfaces of the push-button device extending from the top layer. While it is desirable for the button lens to have a dome shape (e.g., convex) top layer where the top of the dome is external to the gaming machine, other shapes or combinations of shapes for the button lens are also contemplated including a flat or concave shapes. It is contemplated that in certain aspects the side walls of the cap or button lens extend downwardly along the outside perimeter such that the side wall is substantially perpendicular to the top surface of the button lens.

Figure 7:
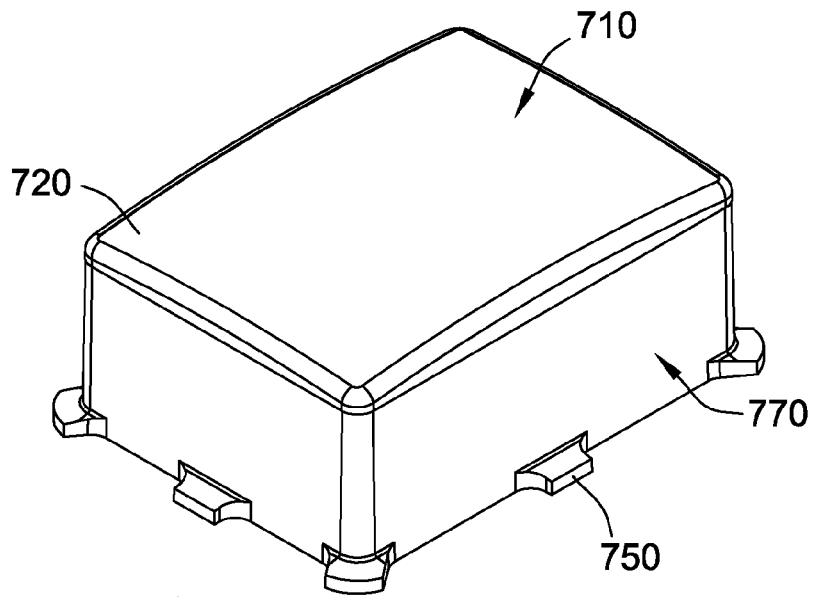
FIG. 7 is a perspective view of an exemplary button lens including a side wall, according to an embodiment of the present invention.
Figure 8:
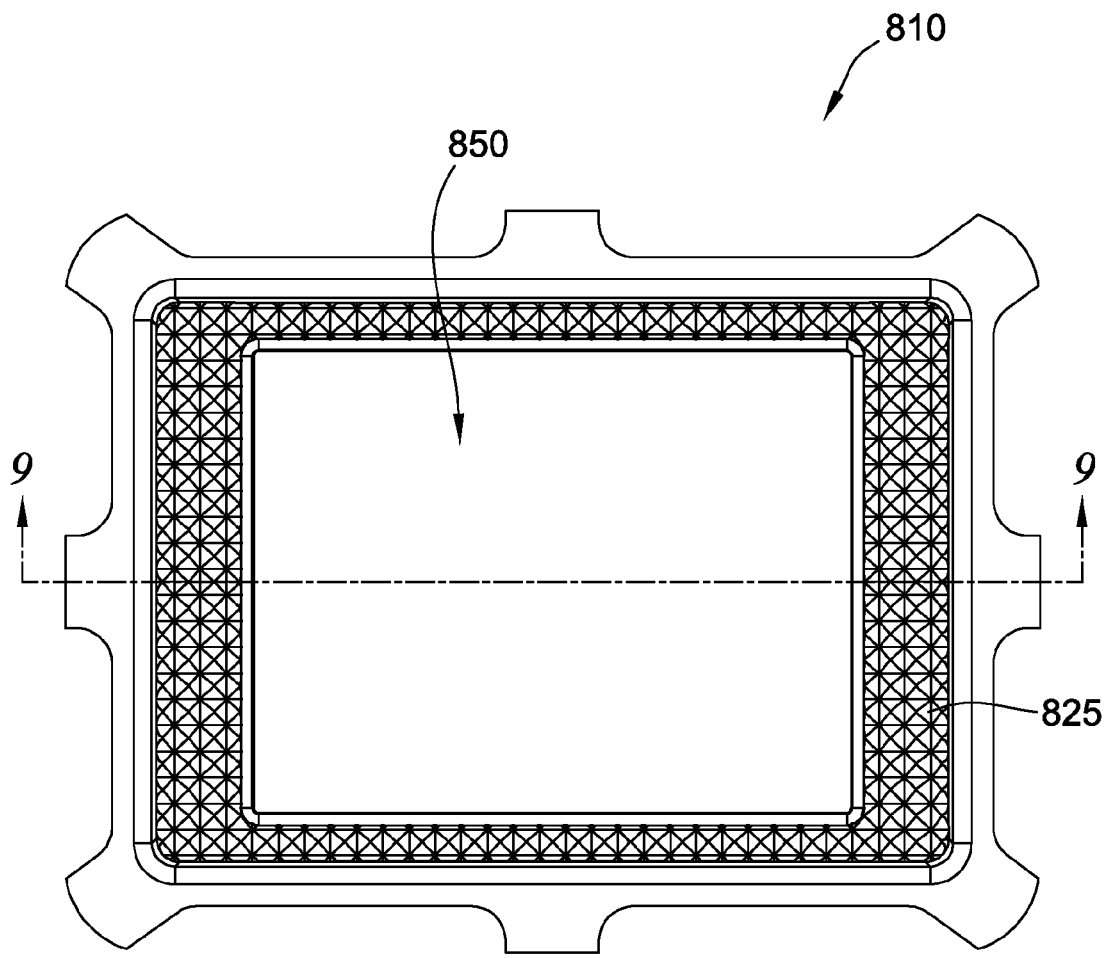
FIG. 8 is a bottom view of the exemplary button lens from FIG. 7, according to an embodiment of the present invention.

Referring now to FIG. 7, a perspective view of an exemplary button lens 710 including side walls 770 is illustrated. The exterior surface of the button lens 710 is directly exposed to the gaming environment and can include an upper dome shaped surface with side walls 770 extending downwardly from the outside perimeter 720 of the button lens. The side wall 770 may also include tabs 750 extending outwardly from the bottom of the side wall 770. The tabs 750 may be used to retain the cap within a button panel. For example, for a cap protruding from a button panel, the tabs 750 may engage the bottom of a top surface of the button panel such that the cap cannot fall out, pop out, or be otherwise removed from the button panel. It is contemplated that in certain aspects of the present disclosure a light source is located below each of the tabs 750 illustrated in FIG. 7, for a total of eight light sources or light elements, such as those described above for FIG. 6. It is contemplated that fewer (e.g., 2 to 7) or more (e.g., >9, 10, 12) light sources may be used as needed so that sufficient light is dissipated on a textured surface that may be fabricated or etched along the outside perimeter of button lens 710. FIG. 8 illustrates a bottom view of an exemplary textured surface 825 that may be etched or otherwise placed onto an interior surface of button lens 710. For example, for aspects where a desired highlight for exposed portions of a push-button device is a continuously lit perimeter, the number of light sources may be determined by the geometry of the light cones generated by each light source and the distance between a top surface of the light source and textured surface. The light cones from each adjacent light source should then overlap on the textured surface as the light cones penetrate the bottom or exposed edge of the side wall and propagate up to the textured surface where the light is dissipated. It is also contemplated that the light sources can be evenly distributed on each side of the button. For example, if a light source includes eight lighting elements, each side of the push-button is illuminated with two lighting elements. If the button lens is circular (not shown), the light source can include lighting elements evenly distributed around the circumference of the circular button lens.

Turning again to FIG. 8, the bottom view of an exemplary cap button lens 810 is illustrated highlighting texturing along an outside perimeter of the lens. The button lens 810 includes a continuous textured surface 825 on the interior of the button lens with an untextured central portion 850. The untextured central portion 850 can be transparent so that when the button lens 810 is part of a push-button assembly, a display, such as an OLED display can be viewed through the button lens.

In certain aspects of the push-button assemblies described herein the top of the button lens has outside width dimensions ranging from about 20 millimeters to about 50 millimeters and outside length dimensions ranging from about 30 to 60 millimeters. In some aspects, the outside width dimensions range from about 27 millimeters to about 37 millimeters and the outside length dimensions range from about 38 millimeters to about 50 millimeters. In some aspects, the height of the sidewall extending from the outside perimeter of a button lens can range from about 10 to 25 millimeters. In some aspects of the push-button assemblies, the thickness of the side wall and top layer of the button lens may range from about 2 millimeters to about 20 millimeters or from about 12 millimeters to about 18 millimeters. The thickness of the side wall and button lens may be uniform or it may vary. For example, the button lens may be thicker at the center, transparent portion of the lens and thinner at the outside perimeter, or the interface between the button lens and sidewalls may be thicker to provide increased strength properties.

The light source can include a plurality of lighting elements, such as LED(s), spaced as described elsewhere herein. The overall intensity that the light source provides to textured or dissipating surfaces of a push-button assembly (e.g., button lens and/or side wall) varies but may range from about 20 to about 200 candelas/m². In some aspects, it may be desirable for the intensity on the dissipating surface(s) to range from about 50 to about 150 candelas//m² or from about 50 to about 100 candelas//m². In certain aspects, it may be desirable for the approximate distance between the top of (each) light source and the bottom or exposed edge of the side wall extending from the button lens to be less than about 13 millimeters (e.g., less than about 0.5 inches). In certain aspects, the distance from the top of the light source (e.g., a lens comprising the top surface of the light source) to the exposed edge of the side wall ranges from about 5 to 13 millimeters. Generally, the closer the light source is to the exposed edge the more lighting elements that will be needed, but each lighting element having a lower intensity. Similarly, the farther the light source is from the exposed edge, the fewer lighting elements that will be needed, but each having a higher light intensities. Furthermore, the greater the distance of the light source from the exposed edge, the more uniform the lighting will appear on the illuminated textured surface. In a desirable configuration, the positioning of the illumination source(s) relative to the base surface of the side wall is such that the amount of light captured and transmitted to the textured, illumination portion(s) of the button lens and/or side wall are maximized.

Referring now to FIGS. 9-14, side-section views of exemplary button lenses are illustrated including exemplary texturing features.

Figure 9:
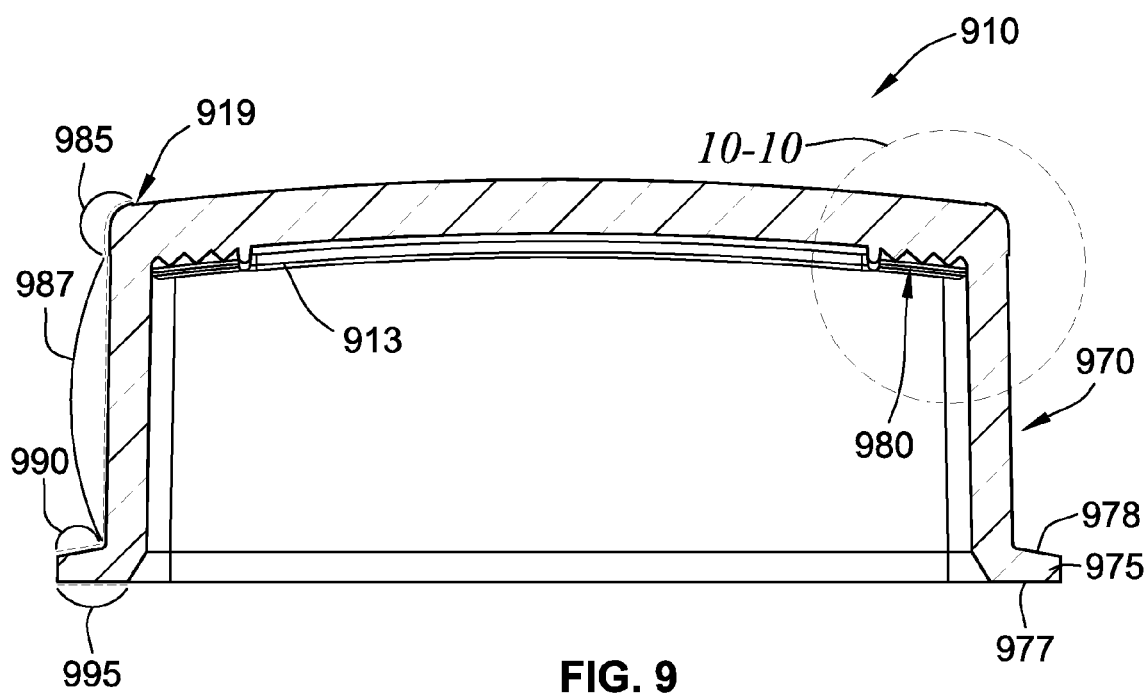
FIGS. 9-14 are side-section views of exemplary button lenses with side walls including various texturing features, according to embodiments of the present invention.
Figure 10:
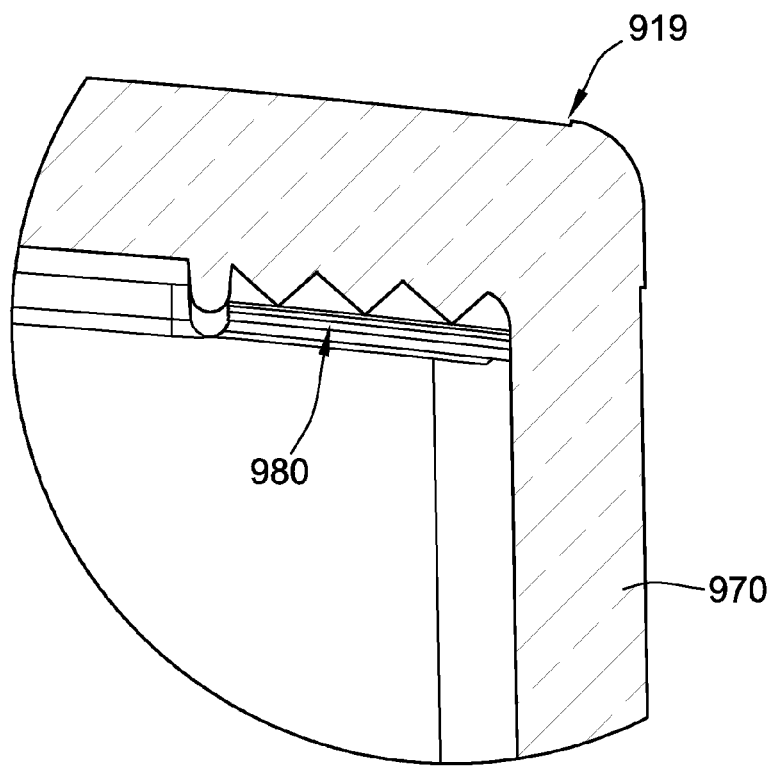

Turning to FIGS. 9-10, an exemplary button lens 910 is illustrated that is textured along an interior surface 913 of the button lens 910 at the outside perimeter 919. Similar to the button lens illustrated in FIG. 6, the button lens 910 includes a side wall 970 extending from an outside perimeter 919 of the button lens. The side wall 970 has a bottom edge 977 that is exposed to a light source. Light from the light source is received at the exposed bottom edge 977, and through total internal reflection, light from the light source propagates up through the side wall 970 and illuminates the textured surface 980. Through diffusion, illumination of the textured surface 980 occurs as the light dissipates over a substantial portion of the textured 980 surface. In some aspects, substantially all of the textured surface 980 is illuminated. It is contemplated that in some aspects the entire outside perimeter 919 of the button lens 910 is textured so that the button lens is continuously illuminated at the outside perimeter which in an operative state of the gaming machine gives the appearance of the button being framed.

In certain alternate aspects of FIGS. 9-10, rather than the button lens being textured along interior surface 980, it is contemplated that other surfaces may instead be textured. For example, a button lens 910 may be continuously textured on the exterior surface of the button lens along the entire outside perimeter as partially illustrated by texturing element 985. As another example, the button lens 910 may be textured on all or a portion of the exterior surface of the side wall 970 extending downwardly from the outside perimeter as partially illustrated by texturing surface 987. As a further example, the button lens 910 may be textured on an extension 975 along the base of the side wall 970. The extension 975 may have a top surface 978 and a bottom surface 977 where texturing may be on the top surface 978 as partially illustrated by texturing surface 990 and/or on the bottom surface 977 as partially illustrated by texturing surface 995. Furthermore, combinations of one or more of texturing elements 980, 985, 987, 990, and 995 are contemplated for the illustrated button lens with side walls. Light from a light source may be received at an exposed edge (e.g., bottom surface 977) of the side wall, and through total internal reflection light from the light source propagates within the side wall until it reaches and illuminates the textured surface(s) that are fabricated or etched onto the surface of the button lens and/or side wall. As discussed for other exemplary aspects of light-dissipating buttons, illumination of the textured surface(s) can occur over a substantial portion of the textured surface. In some aspects, substantially all of the textured surface(s) are illuminated.

Figure 11:
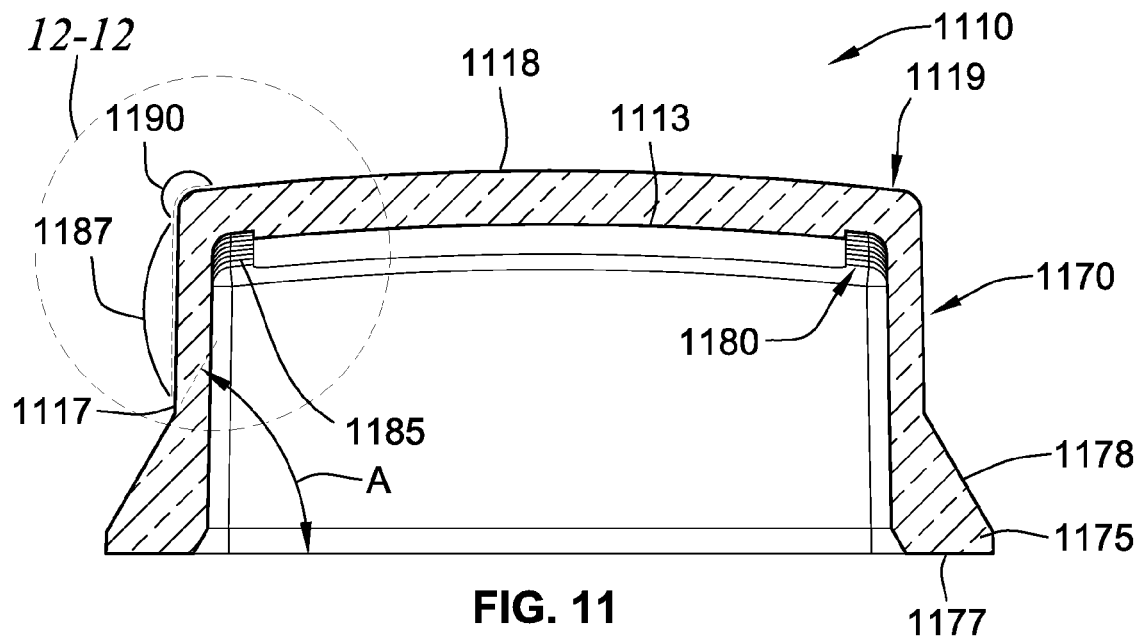
Figure 12:
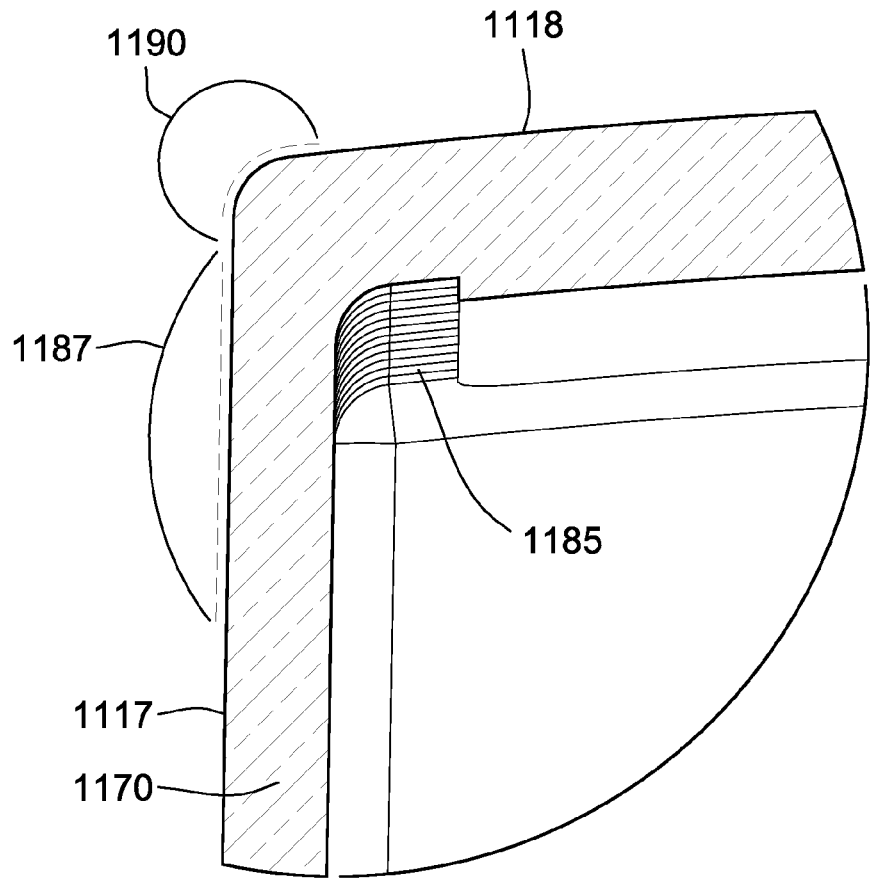

Turning now to FIGS. 11-12, an exemplary button lens 1110 is illustrated along with a side wall 1170 including a side wall extension 1175. The side wall extension 1175 includes a bottom edge 1177 and an angled top surface 1178. In certain aspects, the top surface 1178 has an angle, A, of about 60 degrees relative to the bottom surface of the side wall, which is generally flat. The 60-degree angle of the top surface of the side wall extension can be desirable for directing light up the side wall via principles of total internal reflection. It is contemplated that for total internal reflection principles to operate in a push button fabricated using light-transmitting plastics, such as the push-button assemblies described herein, the critical angle, or angle where total internal refection occurs, is around 42 degrees. An angle, A, greater than 42 degrees is generally expected to maintain total internal reflection within an integral side wall and button lens configuration, such as the one illustrated in FIG. 11.

In some side wall aspects, a desirable lighting effect can be achieved on textured surfaces of the button lens and/or side wall as the angle, A, approaches about 60 degrees, such as illustrated in FIG. 11. As the angle, A, approaches 60 degrees the resultant reflective angle is generally expected to be steeper and thus more light is reflected up to the top of the side wall and to the button lens. Where the angle, A, is closer to the critical angle, or even less than the critical angle, the push-button assembly will have a more glow-like appearance in its display to the gaming device user. Where the angle, A, approaches 60 degrees and even larger angles, the push-button assembly will have more distinct or frame-like appearance in its display to the gaming device user. At the outside perimeter 1119 on the interior surface 1113 of the button lens 1110, near the corner at the intersection of the side wall 1170 and button lens 1110, some aspects of the button lens 1110 include a notch 1180 that can extend around a substantial portion or the entire perimeter of the button lens 1110. The purpose of the notch is to create a demarcation between the illumination surface area (e.g., including the notched area) and non-illumination surface area within the lens (e.g., the center portion 1118 of the button lens that remains transparent or non-textured).

The button lens 1110 may be textured similar to the embodiments described above for FIGS. 6-10. For example, the button lens 1110 can be textured along a substantial portion of the bottom edge 1177 and/or at the angled top surface 1178 of the side wall extension 1175. It may also be desirable in certain aspects to texture the button lens 1110 along the entire interior surface at the perimeter of the button lens 1110 at the notch 1180, as partially illustrated by texturing surface 1185. It may also be desirable to continuously texture the upper portion of an exterior surface 1117 of the side wall 1170, as partially illustrated by texturing surface 1187. In addition, it can be desirable to also or to alternatively texture the exterior surface 1118 of the button lens 1110 at its entire outside perimeter 1119, as partially illustrated by texturing surface 1190.

Figure 13:
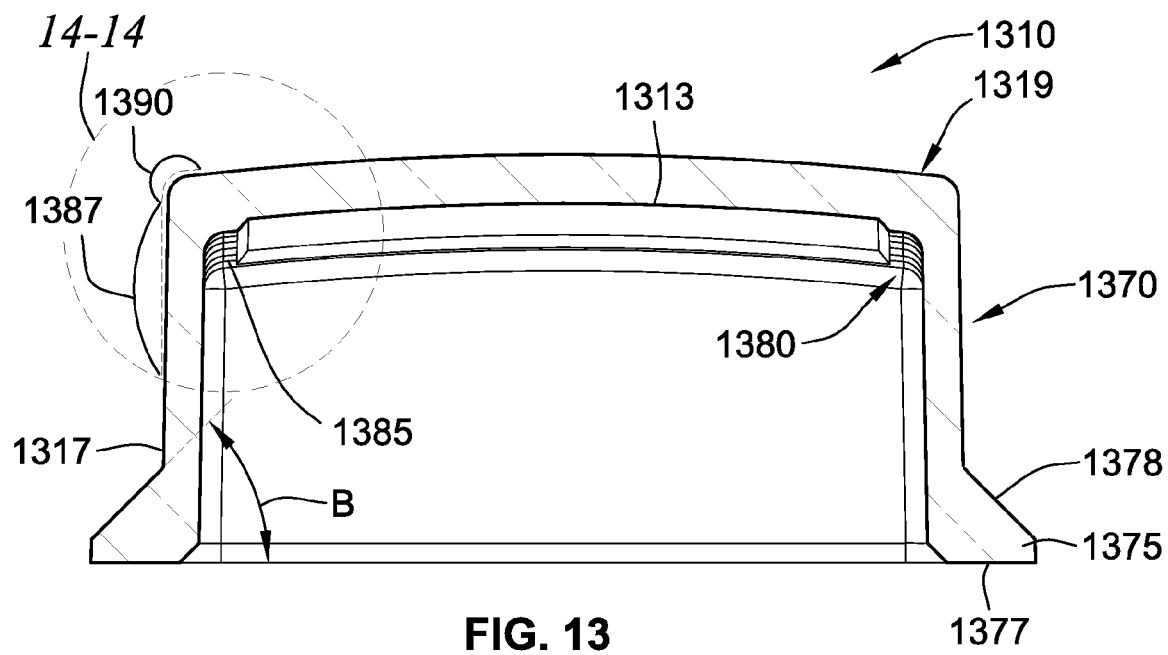

It is contemplated that in some aspects of a side wall and button lens configuration to not have an angled, integral reflector such as the reflector created by exemplary surface 1178 (e.g., or surface 1378 discuss in FIG. 13). For such configurations, the total internal reflection process within the integral side wall and button lens relies on the light rays from the light source that are parallel or near parallel to the interior and exterior surfaces of the side wall to be transmitted up the wall thickness to the button lens. Similar principles occur on the side wall and button lens configurations having the angled reflector (e.g., surfaces 1178 or 1378), but the advantage of the angled reflector surface is that it gathers more light for transmission up to the desired area(s) configured to dissipate the light.

Figure 14:
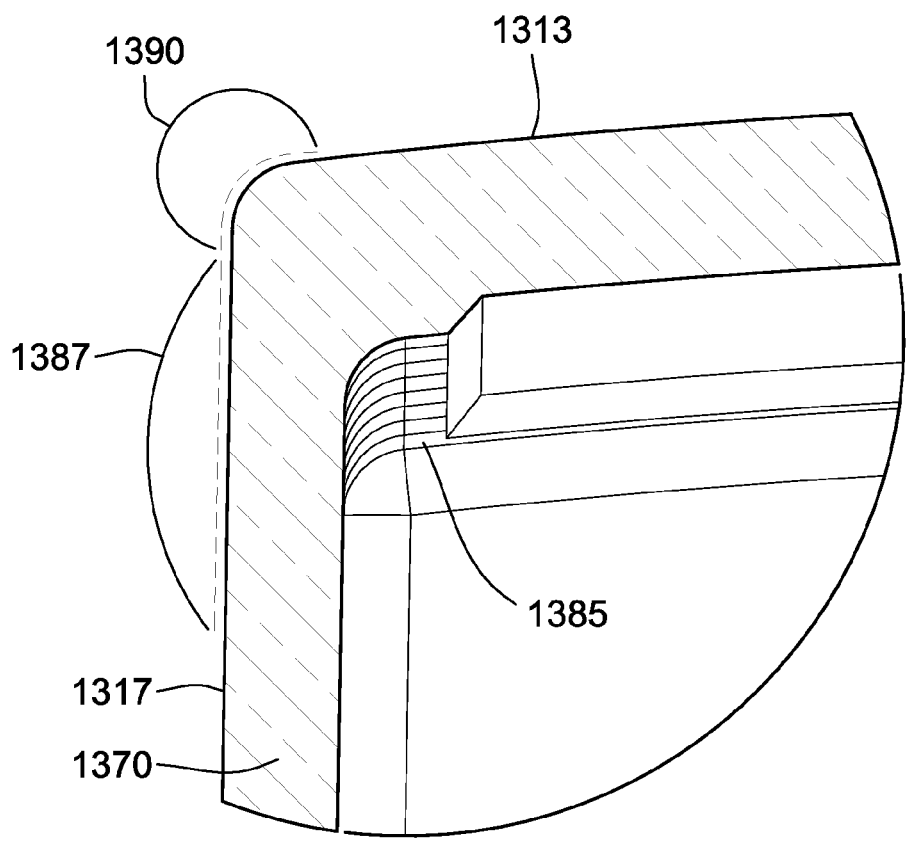

Turning now to FIGS. 13-14, an exemplary button lens 1310 is illustrated including a side wall 1370 having a side wall extension 1375, similar to FIG. 11. The side wall extension 1375 includes a bottom edge 1377 and an angled top surface 1378 having an angle, B. In some aspects, the angle, B, of the top surface 1378 is about 45 degrees and exhibits similar reflection properties described for FIG. 11. The angle, B, can be other values, and as described for FIG. 11, the angle will affect the appearance of the lighting of any areas configured to dissipate light that enters into the side wall 1370. At the outside perimeter 1319 on an interior surface 1313 of the button lens 1310, at or near the intersection of the side wall 1370 and the button lens 1310, a bulge 1380 extends about the entire perimeter of the button lens. Similar to the notch, the purpose of the bulge is to create a demarcation between the illumination surface area (e.g., including the bulge area) and non-illumination surface area within the lens (e.g., the center portion of the button lens that remains transparent or non-textured).

The button lens 1310 may be textured similar to the aspects described above for FIGS. 6-12. For example, the button lens 1310 can be textured along a substantial portion of the bottom edge 1377 and/or at the angled top surface 1378 of the side wall extension 1375. It may also be desirable in certain aspects to texture the button lens 1310 along substantial portions or the entire perimeter of the button lens at the bulge 1380, as partially illustrated by texturing element 1385. It may further be desirable to continuously texture the upper portion of the exterior surface 1317 of the side wall 1370 about the perimeter of the button lens 1310, as partially illustrated by texturing surface 1387. In addition, it can be desirable to also, or to alternatively, texture the exterior surface 1317 of the button lens 1310 at the outside perimeter 1319 of the button lens, as partially illustrated by texturing surface 1390. Upon the application of a light source at bottom edge 1377, light can then be transmitted into the side wall 1370 and up to the button lens 1310.

The different light dissipating configurations illustrated in FIGS. 7-14 are each expected to provide varying lighting appearances to the gaming machine user. For example, the bulge feature 1380 with its texturing element 1385 is expected to provide a more distinct or crisp, frame-like illumination appearance when the push-button assembly is observed in its operating state. In contrast, the notch feature 1180 with its texturing element 1185 illustrated in FIG. 11 is expected to provide a less distinct or fuzzier, more glow-like illumination appearance when compared to the bulge feature 1380 of FIG. 13. Similarly, the texturing of an interior surface or providing of an irregular interior surface on a button lens or side wall is expected to provide a more distinct or crisp, frame-like illumination appearance. In contrast, the texturing of an exterior surface is expected to provide a less distinct or fuzzier, more glow-like illumination appearance when compared to interior surface texturing. Finally, comparing side wall texturing with texturing along a perimeter of the button lens provides similar contrasting lighting appearances. For example, the texture surfaces 1187, 1387 along the side walls 1170, 1370 of FIGS. 11 and 13 tend to provide a more distinct or crisp, frame-like illumination appearance when the push-button assembly is observed in its operating state. In contrast, texture surfaces 1190, 1390 along the perimeter of button lenses 1110, 1310 tend to provide a less distinct or fuzzier, more glow-like illumination appearance when compared to the side wall texturing. Furthermore, texturing of perimeter surfaces 1185, 1385 are expected to provide a more frame-like appearance when compare to perimeter texturing surface 1190, 1390. It is also contemplated that texturing similar to the button lens illustrated in FIGS. 9-10 provides illumination having a more framing-like effect about the perimeter of the push button, particularly where an interior perimeter of the button lens includes a raised, rib feature and a light, surface texturing feature equivalent to an MT11010 texture.

Figure 15:
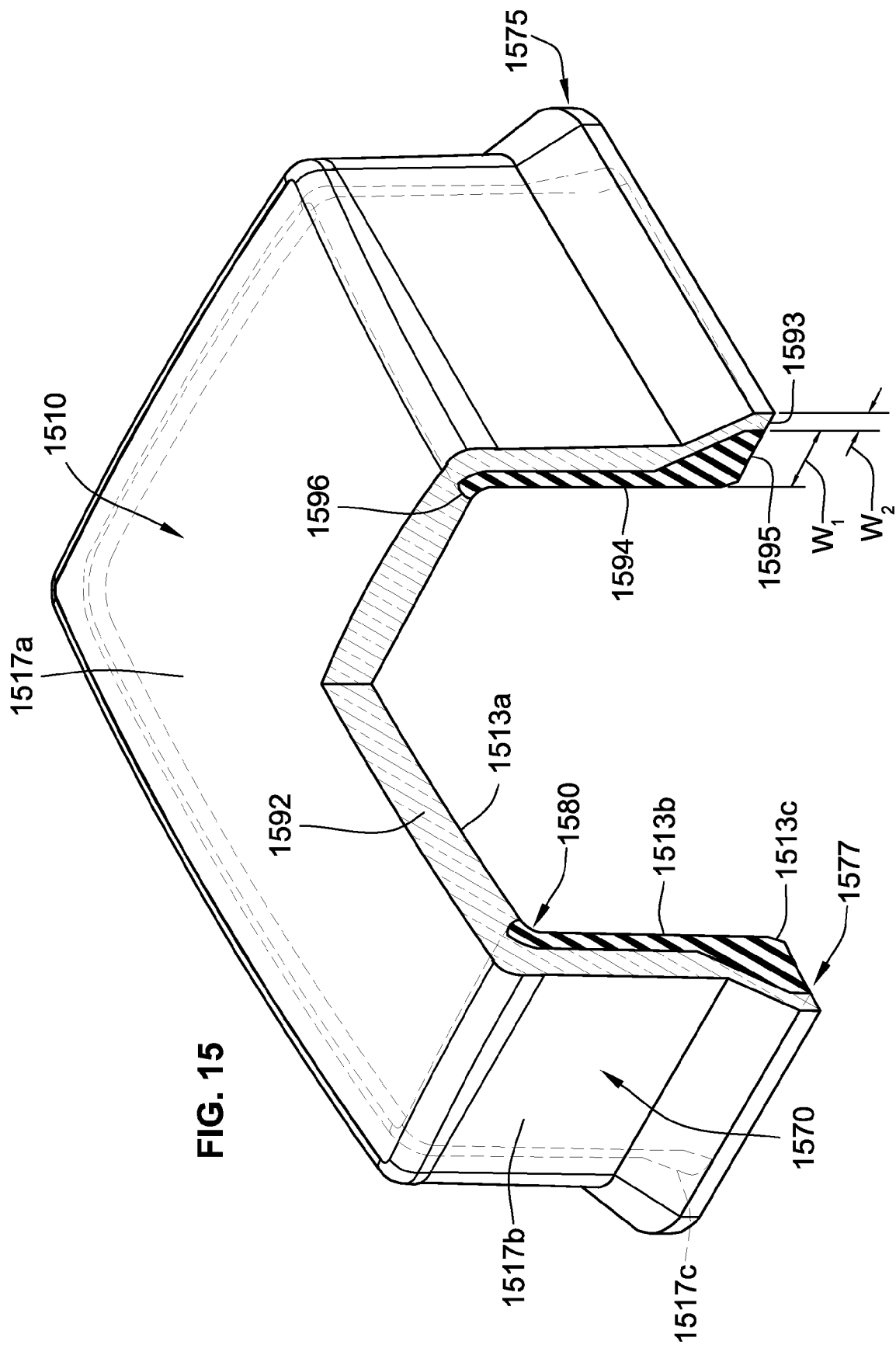
FIG. 15 is a perspective section view of an exemplary button lens including side walls fabricated using two materials, according to an embodiment of the present invention.

Referring now to FIG. 15, an exemplary button lens 1510 is illustrated including a side wall 1570 having a side wall extension 1575. The integral button lens and side wall arrangement can be fabricated as a two-material system where at least a portion of the button lens 1510, side wall 1570, and/or side wall extension 1575 comprise a two-layer system based on two different materials. For example, in the aspect illustrated in FIG. 15, the exterior surfaces 1517a-c can comprise a first material 1592. Furthermore, a substantial portion of the button lens interior surface 1513a can also be fabricated or molded using the first material 1592. The side wall and extension interior surfaces 1513b-c can be fabricated or molded using a second material 1594 extending through the interior corner 1580 where the button lens and side wall intersect. The first material 1592 and the second material 1594 may be formed such that the interior surfaces 1513a-c have a substantially smooth transition from the first material 1592 to the second material 1594. For example, the transition from the first material 1592 to the second material 1594 may be abrupt, but the interior surface remains smooth at the transition point. At transition end 1596, the second material may terminate with a flat surface after extending around interior corner 1580. In some aspects, it can be desirable for the transition end 1596 to be directed more toward the player such that the transition end is flat or rounded with the flat or rounded end directed outward from the button lens, but still below surface 1517a, similar to the illustration in FIG. 15. It is also contemplated that the two-layer button lens and side wall system may be integrally formed such that the final button lens and side wall product is a single unit.

In some aspects, it may be desirable for the thickness of the second, diffusing, material 1594 to be thicker near the base of the side wall where the light from a light source is expected to enter along a bottom surface 1577. For example, at the bottom surface 1577, the second material 1594 may have a width or thickness, $w_1$, and the first material 1592 may have a width or thickness, $w_2$, where $w_1$ is greater than $w_2$. In some aspects, it is contemplated that $w_2$ may be greater than $w_1$ or the thickness of both material may be similar. Surface 1513c can also be angled (shown) similar to surface 1517c or it may be substantially normal (not shown) to bottom surface 1577.

The method of manufacturing the two-material system illustrated in FIG. 15 can include shot molding where there are two separate materials injected in a single machine operation. Insert molding is also contemplated where an initial shot based on the first material for the first component is inserted into another mold for molding the second component based on the second material. The outcome of either molding process results in integrating the two materials into a single component that functions similar to the textured or faceted aspects described earlier for other buttons.

It is contemplated that the first and second materials can have different diffusion properties. For example, the first material may be a clear or transparent polymer material. The second material may be translucent or opaque polymer material, and further have diffusion properties, similar to a satin ice acrylic, such as the acrylic known as ACRYLITE® Satin Ice available from Evonik Industries AG of Essen Germany and its US distributor, Evonik Cyro LLC of Parsippany, N.J., USA. Another exemplary material contemplated for the second material includes an injection molding grade of a polycarbonate, light diffusing translucent compound, such as RTP 0399X114728 S-26693 available from RTP Company of Winona, Minn., USA.

Similar to the button aspects described for FIGS. 6-14, the button lens of FIG. 15 allows light, directed up from the base or bottom surface 1577 of the side wall, to be piped through the side wall and onto the top surface of button lens to give the impression of an illuminated bezel, without the need of an actual illuminated bezel. The light source may have a similar layout to what was described earlier for FIG. 6 and can include LEDs that may be situated below the bottom surface 1577 just below the first material 1592, the second material 1594, or under both. For example, it may be desirable in certain aspects for the light source to be positioned directly below the second or diffusing material. It may also be desirable for the light source (e.g., omnidirectional LED) to be positioned just below the center of the diffusing material thickness that is exposed at surface 1595. For aspects where it is preferred to diffuse the light entering the side wall earlier and achieve less "hot spotting", it may be desirable to have the light source positioned more directly below the diffusing material of the side wall rather than below the transparent material. The light may then be more directly channeled thru the diffusion material from the end proximal to the light source (e.g., 1595), and transmitted through and dispersed at the distal end (e.g., 1596), which is visible thru the transparent portion of the button lens.

By applying a light source to the various button arrangements described herein, a desirable effect of a neon-type glow or a crisp, frame-like appearance can occur at the top outside perimeter of a button assembly. Each of the embodiments described herein provide varying levels of the glow or framing effects. For example, the translucent diffusion feature illustrated in FIG. 15 can include a geometry at the uppermost visible portion of the second material to provide a variety of illumination effects. In some aspects, this can be combined with various textures and selectively polished areas to create a combined effect resulting in a more pronounced and distinctive glow. It is also contemplated that it may be desirable to have an integral side wall and button lens configuration that maximizes the light captured from a light source and the light transmitted to a textured portion, such as the configuration illustrated in FIG. 15, or to a lesser extent, the configurations illustrated in FIG. 13 or FIG. 11.

It is contemplated that is some aspects a push-button device associated with a gaming machine includes a button lens with interior and exterior surfaces extending to an outside perimeter of the button lens. In an operative state of the gaming machine, the exterior surface is exposed to and the interior surface is protected from a gaming environment external to a gaming machine. A side wall includes a protected interior surface and an exposed exterior surface. The side wall extends downwardly from the outside perimeter of the button lens. The side wall includes a first end attached to the outside perimeter of the button lens and a second end having an exposed bottom edge. The button lens and side walls include material(s) that allows light to pass through. A textured surface is located along a perimeter of the push-button device. The perimeter is defined by the outside perimeter or by the side wall. A light source is disposed below the bottom edge of the side wall. The light source is operative to transmit light into the side wall such that the perimeter of the push-button device is illuminated at the textured surface. Furthermore, the textured surface configured to dissipate the light over a substantial portion of the textured surface.

It is further contemplated that in additional aspect the textured surface extends continuously along the outside perimeter only of the exterior surface of the button lens and the exposed surface only of the side wall near the first end. The side wall can include a side wall extension extending from the second end in a direction approximately parallel to the button lens surfaces, such as the interior or exterior surfaces of the button lens. The textured surface can be disposed on the exposed surface of the side wall along the side wall extension. The light source(s) can be disposed directly below the side wall extension.

In some aspects, the side wall includes a side wall extension extending from the second end in a direction approximately parallel to the button lens. The textured surface can be disposed on the bottom edge of the side wall along the side wall extension. It is also contemplated that at least a portion of the side wall extension further extends at approximately a 45 degree angle relative to one of the button lens surfaces.

In some aspects, the textured surface can be made via an etching process. Furthermore, the textured surface can be integral with the button lens or the side wall.

It is also contemplated that in some aspects, the button lens is integral with the side walls. The button lens and side walls can have a resting position and a depressed position where the exposed edge of the side wall and the light source are separated by a distance of less than about 0.5 inches with the button lens in the resting position.

It is contemplated that in some aspects of a gaming machine, a player-input device for detecting player selections includes a light-transmissive button lens including interior and exterior surfaces extending to an outside perimeter. A textured surface is located along the outside perimeter of the button lens. A light source is disposed below a bottom edge of the button lens. The light source can be operative to transmit light into the button lens such that the outside perimeter of the button lens is illuminated at the textured surface. The textured surface can be configured to dissipate the light over a substantial portion of the textured surface.

It is further contemplated that in additional aspects, the textured surface extends continuously along the outside perimeter only of the interior surface of the button lens. It is also contemplated that the side wall can extend downwardly in a direction substantially perpendicular to the button lens surfaces. In some aspects the textured surfaces discussed herein can be etched onto the button lens surface, as part of, for example, a molding process. In other aspects, the textured surface may be a separate layer or a separate or different material that provides the texture surface. A secondary component or integrally molded secondary material with a varied translucency could also be combined with the primary button lens material to provide the textured surface. It is also contemplated that the textured surfaces can be mechanically or chemically applied to a button lens formed after a molding process, including laser or photo/chemical etching processes. In certain aspects of the present disclosure, the texturing is made via a Mold-Tech MT11010 texture, available from Mold-Tech® Midwest, a Standex International company, of Carol Stream, Ill. Other Mold-Tech processes that are contemplated for the textured surface include the MT 11020 and MT 11030 textures. In some aspects, the majority of the button lens material has a transparent surface with just the outside perimeter of the button lens being textured, and thus, opaque or otherwise translucent.

In some aspect, the light source of the player-input device can include light-emitting diodes (LEDs). The LEDs can be omnidirectional or directional. Furthermore, the light source can include colors of varied brightness and intensities.

It is contemplated that in some aspects of a gaming machine, a push-button assembly is included for detecting player selections. The push-button assembly includes a light-transmissive button lens. A light-transmissive side wall extends downwardly from an outside perimeter of the button lens. A textured surface is located along the side wall or an outside perimeter of the button lens. A light source is disposed below an exposed edge of the side wall. The light source is operative to transmit light into the side wall and illuminate the textured surface. The textured surface is configured to dissipate the light over a substantial portion thereof.

In some aspects of the push-button device(s) and push-button assembl(ies) described herein, the button lens and side walls can be located on a button panel. Furthermore, the light source can include a plurality of omnidirectional light sources. In some aspects, each of the plurality of omnidirectional light sources is spaced with a predetermined distance between each light source such that the light from each adjacent omnidirectional light source overlaps when the textured surface is illuminated. The overlap forms a continuous illumination of the textured surface.

Another benefit of having a textured surface on the button lens which dissipates the light from the light source is that it minimize the formation of "hot spots" during the lighting of the button lens that tend to form from having a point sourced type of light source. Otherwise, the light source would need to be a continuous light source extending around the perimeter of the button lens. Such a continuous light source would be less efficient and may not entirely minimize "hot spotting" issues.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A push-button device associated with a gaming machine, the push-button device comprising:
    a button lens including interior and exterior surfaces extending to an outside perimeter, wherein in an operative state the exterior surface is exposed to and the interior surface is protected from a gaming environment external to a gaming machine;
    a side wall including a protected interior surface and an exposed exterior surface, the side wall extending downwardly from the outside perimeter of the button lens, the side wall including a first end attached to the outside perimeter of the button lens and a second end having an exposed edge, the button lens and side walls comprising a material that allows light to pass through;
    a textured surface located along a perimeter of the push-button device, the perimeter defined by at least one of the outside perimeter and the side wall; and
    a light source disposed below the second end of the side wall, the light source operative to transmit light into the side wall such that the perimeter of the push-button device is illuminated at the textured surface, the textured surface configured to dissipate the light over a substantial portion of the textured surface.

2. The push-button device of claim 1, wherein the textured surface extends continuously along the outside perimeter only of the exterior surface of the button lens and the exposed surface only of the side wall near the first end.

3. The push-button device of claim 1, wherein the side wall includes a side wall extension extending from the second end in a direction approximately parallel to the button lens surfaces, the textured surface being disposed on the exposed surface of the side wall along the side wall extension.

4. The push-button device of claim 3, wherein the light source is further disposed directly below the side wall extension.

5. The push-button device of claim 1, wherein the side wall includes a side wall extension extending from the second end in a direction approximately parallel to the button lens surfaces, the textured surface being disposed on the exposed edge of the side wall along the side wall extension.

6. The push-button device of claim 5, wherein at least a portion of the side wall extension further extends at approximately a 45 degree angle relative to one of the button lens surfaces.

7. The push-button device of claim 1, wherein the textured surface is made via an etching process, the textured surface being integral with at least one of the button lens and the side wall.

8. The push-button device of claim 1, wherein the button lens is integral with the side walls, the button lens and side walls in the operative state having a resting position and a depressed position, the exposed edge of the side wall and the light source being separated by a distance of less than about 0.5 inches in the resting position.

9. A player-input device for detecting player selections at a gaming machine, the player-input device comprising:
a light-transmissive button including a top button lens with interior and exterior surfaces extending to an outside perimeter and a sidewall extending downwardly from the outside perimeter of the top button lens;
a textured surface located along a perimeter of the button, the perimeter defined by at least one of the side wall and the outside perimeter of the top button lens; and
a light source disposed below a bottom edge of the sidewall, the light source operative to transmit light into the bottom edge such that the perimeter is illuminated at the textured surface, the textured surface configured to dissipate the light over a substantial portion of the textured surface.

10. The player-input device of claim 9, wherein the textured surface extends continuously along the outside perimeter only of the interior surface of the top button lens.

11. The player-input device of claim 9, wherein the side wall extends downwardly from the outside perimeter in a direction approximately perpendicular to the top button lens surfaces.

12. The player-input device of claim 9, wherein the light source includes light-emitting diodes.

13. The player-input device of claim 9, wherein the light source includes colors of varied brightness and intensities.

14. The player-input device of claim 9, wherein the textured surface is a separate layer.

15. The player-input device of claim 9, wherein the majority of the top button lens material is a transparent material.

16. The player-input device of claim 9, wherein the textured surface is made via an etching process.

17. A gaming machine for playing a wagering game, the gaming machine including at least one push-button assembly for detecting player selections, the at least one push-button assembly comprising:
a light-transmissive push-button including a button lens defining an outside perimeter and a side wall extending downwardly from the outside perimeter;
a textured surface located along a perimeter of the push-button, the perimeter defined by at least one of the side wall and an outside perimeter; and
a light source disposed below an exposed edge of the side wall, the light source operative to transmit light into the side wall at the exposed edge such that the perimeter of the push-button is illuminated at the textured surface, the textured surface configured to dissipate the light over a substantial portion thereof.

18. The gaming machine of claim 17, wherein the button lens and side walls are located on a button panel.

19. The gaming machine of claim 17, wherein the light source includes a plurality of omnidirectional light sources.

20. The gaming machine of claim 17, wherein each of the plurality of omnidirectional light sources are spaced with a predetermined distance between each light source such that the light from each adjacent omnidirectional light source overlaps when the textured surface is illuminated, the overlap forming a continuous illumination of the textured surface.

\* \* \* \* \*